(12) United States Patent
Chao et al.

(10) Patent No.: US 11,142,845 B2
(45) Date of Patent: Oct. 12, 2021

(54) COMPOSITE STRUCTURE AND DISPERSION

(71) Applicant: INDUSTRIAL TECHNOLOGY RESEARCH INSTITUTE, Hsinchu (TW)

(72) Inventors: Pei-Ying Chao, Taoyuan (TW); Yung-Pin Huang, New Taipei (TW); Tzu-Hsien Han, Hsinchu (TW); Pei-Yi Yeh, Hemei Township (TW); Kuo-Hsing Lee, Hsinchu (TW); Chih-Lung Chen, Zhudong Township (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 306 days.

(21) Appl. No.: 16/227,769

(22) Filed: Dec. 20, 2018

(65) Prior Publication Data

US 2020/0199782 A1 Jun. 25, 2020

(51) Int. Cl.
*D01D 5/00* (2006.01)
*B82Y 30/00* (2011.01)
(Continued)

(52) U.S. Cl.
CPC .............. *D01D 5/003* (2013.01); *B82Y 30/00* (2013.01); *B82Y 40/00* (2013.01); *D01F 1/09* (2013.01); *D01F 6/70* (2013.01); *H01B 1/22* (2013.01)

(58) Field of Classification Search
CPC ........ B82Y 30/00; B82Y 40/00; D01D 5/003; D04H 3/00; D04H 3/022; D04H 3/077; D04H 3/016; D04H 1/00; D04H 1/10; D04H 1/12; D04H 1/14; D04H 1/4209; D04H 1/4234; D04H 1/4242; D04H 1/4282; D04H 1/43; D04H 1/4309; D04H 1/4334; D04H 1/4342; D04H 1/4358; B32B 5/00;
(Continued)

(56) References Cited

U.S. PATENT DOCUMENTS

| 9,309,405 B2 | 4/2016 | Park et al. |
| 2004/0063915 A1 | 4/2004 | Diner et al. |

(Continued)

FOREIGN PATENT DOCUMENTS

| CN | 102725085 A | 10/2012 |
| CN | 103947002 A | 7/2014 |

(Continued)

OTHER PUBLICATIONS

Machine translation of WO 2016052929 A obtained from Global Dossier (Year: 2016).*
Taiwanese Office Action and Search Report, dated Jun. 13, 2019, for Taiwanese Application No. 107146179.
Chinese Office Action and Search Report, dated Dec. 3, 2020, for Chinese Application No. 201910052610.9.

*Primary Examiner* — Jennifer A Boyd
*Assistant Examiner* — Braelyn R Watson
(74) *Attorney, Agent, or Firm* — Birch, Stewart, Kolasch & Birch, LLP

(57) ABSTRACT

A composite structure and dispersion employing the same are provided. The composite structure includes 1 part by weight of silver nanowires, and 1.2 to 3 parts by weight of nanofibers, wherein the diameter of the silver nanowires and the diameter of the nanofibers have a ratio of 1:1 to 1:10.

15 Claims, 1 Drawing Sheet

(51) Int. Cl.
*D01F 6/70* (2006.01)
*D01F 1/09* (2006.01)
*H01B 1/22* (2006.01)
*B82Y 40/00* (2011.01)

(58) Field of Classification Search
CPC .. B32B 5/02; B32B 5/022; B32B 5/24; B32B 15/02; B32B 2262/00; B32B 2262/02–0292; B32B 2262/103; B32B 2255/02; B32B 2255/00; B32B 2255/04; B32B 2255/10; B32B 2255/103; B32B 2255/106; C08K 2201/003; C08K 2201/004; C08K 2201/011; C08K 2201/014; C08K 2201/016; C08K 2201/033; C08K 3/04; C08K 3/041; C08K 3/042; C08K 3/043; C08K 3/044; C08K 3/045; C08K 3/046; C08K 3/08; C08K 3/0831; C08K 3/085; C08K 3/0856; C08K 3/0825; C08K 2003/0806; C08K 7/02; C08K 7/06; C08K 3/0806; C01B 32/15; C01B 2202/00; C01B 2202/20; C01B 2202/34; C01B 2202/36; B22F 1/0018; B22F 1/0025; D01F 9/00; D01F 1/09; D01F 6/70; H05K 2201/0108; H05K 2201/00; H01B 1/22; D10B 2401/16; C09D 11/52
USPC ... 428/299.1, 299.7, 319.9, 401, 330.4, 221, 428/297.4, 304.4, 357, 370; 977/707, 977/742–753, 762, 773, 932, 952, 770; 442/64, 71, 72, 111, 110
See application file for complete search history.

(56) References Cited

U.S. PATENT DOCUMENTS

| | | | |
|---|---|---|---|
| 2007/0284557 A1* | 12/2007 | Gruner | B82Y 40/00 252/500 |
| 2010/0106233 A1 | 4/2010 | Grant et al. | |
| 2011/0177332 A1 | 7/2011 | Park et al. | |
| 2011/0210282 A1* | 9/2011 | Foley | B82Y 25/00 252/62.51 R |
| 2012/0088240 A1 | 4/2012 | Baker et al. | |
| 2014/0065422 A1* | 3/2014 | Kim | H01B 1/22 428/401 |
| 2015/0187455 A1* | 7/2015 | Hsiao | H01B 1/22 252/514 |
| 2016/0322842 A1 | 11/2016 | Pavlovic et al. | |

FOREIGN PATENT DOCUMENTS

| | | | |
|---|---|---|---|
| CN | 104575658 A | 4/2015 | |
| CN | 104867621 A | 8/2015 | |
| CN | 105063804 A | 11/2015 | |
| CN | 103440907 B | 1/2016 | |
| CN | 107170510 A | 9/2017 | |
| CN | 107177977 A | 9/2017 | |
| CN | 107478360 A | 12/2017 | |
| CN | 108372313 A | 8/2018 | |
| KR | 10-2014-0127517 A | 11/2014 | |
| TW | 201615764 A | 5/2016 | |
| WO | WO-2016052929 A1 * | 4/2016 | H01L 33/42 |

* cited by examiner

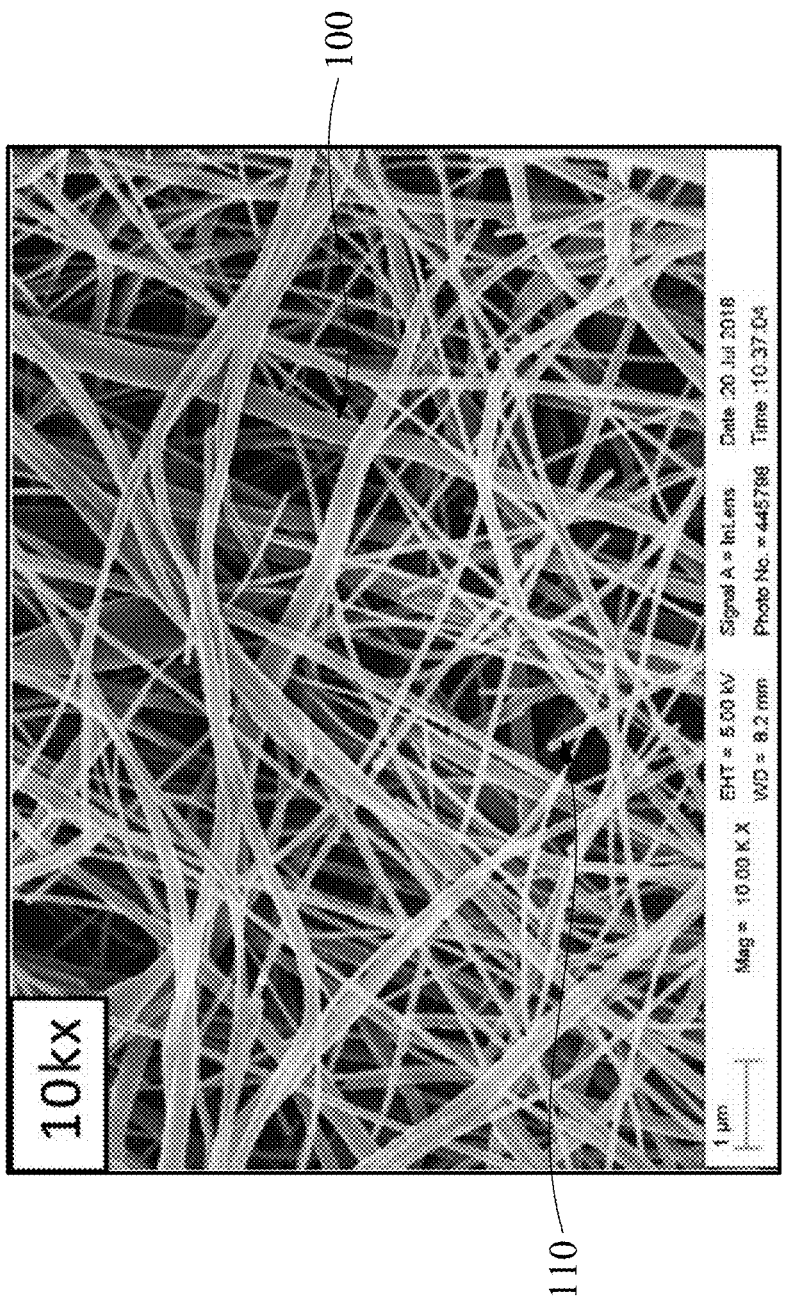

COMPOSITE STRUCTURE AND DISPERSION

TECHNICAL FIELD

The technical field relates to a composite structure, and in particular it relates to a dispersion including the same.

BACKGROUND

In recent years, electronic elements have been combined with fabrics to create the trend of wearable electronic devices. Conductive films have potential for application in photoelectric products such as solar cells, flat-panel displays, electroluminescent elements, and wearable electronic elements, especially the small, lightweight portable electronic products widely used in daily life. The conductive film should satisfy the requirements of being transparent and lightweight and having high conductivity, low cost, and the like. The silver nanowires are an ideal material due to their high conductivity, excellent optical performance, resistance to bending, and the like.

However, silver nanowires are randomly dispersed in solvent, and alternately stacked on each other to achieve high conductivity after forming a film. As such, the resistance consistency of the transparent conductive film is greatly influenced by the uniformity of the silver nanowires. However, the silver nanowires are not dispersed well in solvent and inconsistently stacked in the material, and the resistance of the material is easily uniform to negatively influence the conductivity of the material.

Therefore, a novel composite structure is needed to address issues with conventional skills (e.g. non-uniform dispersal and high sheet resistance) and achieve the benefit of lowering costs (reducing the amount of the composite structure).

SUMMARY

One embodiment of the disclosure provides a composite structure, including: 1 part by weight of silver nanowires; and 1.2 to 3 parts by weight of nanofibers, wherein the diameter of the silver nanowires and the diameter of the nanofibers have a ratio of 1:1 to 1:10.

One embodiment of the disclosure provides a dispersion, including 1 part by weight of silver nanowires; 1.2 to 3 parts by weight of nanofibers; and 500 to 2000 parts by weight of solvent, wherein the diameter of the silver nanowires and the diameter of the nanofibers have a ratio of 1:1 to 1:10.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein:

FIG. 1 shows a SEM photograph of a composite conductive layer of silver nanowires and nanofibers in one embodiments of the disclosure.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

One embodiment of the disclosure provides a composite structure, including 1 part by weight of silver nanowires and 1.2 to 3 parts by weight of nanofibers, in which the diameter of the silver nanowires and the diameter of the nanofibers have a ratio of 1:1 to 1:10. If the weight ratio of the silver nanowires is too high (e.g. the weight ratio of the nanofibers is too low), the cost will be high and the optical haze will be high. If the weight ratio of the silver nanowires is too low (e.g. the weight ratio of the nanofibers is too high), the silver nanowires cannot be connected to be conductive. If the ratio of the diameter of the silver nanowires to the diameter of the nanofibers is too high (e.g. nanofibers that are too narrow and/or silver nanowires that are too wide), the silver nanowires cannot be uniformly dispersed in the support of the nanofibers. If the ratio of the diameter of the silver nanowires to the diameter of the nanofibers is too low (e.g. nanofibers that are too wide and/or silver nanowires that are too narrow), the non-uniformity of the nanofibers will be increased, and it will be difficult to connect the silver nanowires.

In one embodiment, the silver nanowires have a diameter of 50 nm to 80 nm and a length of 20 μm to 50 μm. Alternatively, the silver nanowires have an aspect ratio of 300 to 1000. If the diameter of the silver nanowires is too small, the non-uniformity of the nanofibers will be relatively increased, and it will be difficult to connect the silver nanowires. If the diameter of the silver nanowires is too large, the silver nanowires cannot be uniformly dispersed in the support of the nanofibers.

In one embodiment, the nanofibers have a diameter of 50 nm to 500 nm. The above diameter range of the nanofibers helps the silver nanowires be uniformly dispersed and connected (but not aggregated). It may improve the conductivity and lower the sheet resistance of the composite structure. If the diameter of the nanofibers is less than 50 nm, the nanofibers will be too narrow to support the silver nanowires. If the diameter of the nanofibers is larger than 500 nm, the nanofibers that are too wide may result in a non-uniform surface of the nanofibers, such that the silver nanowires deposited on the nanofibers need to overcome a higher barrier to connect to each other, which easily causes the composite structure to have a high resistance.

General nano cellulose has a diameter of about 5 nm to 20 nm, a length of about 1 μm to 2 μm, and an aspect ratio of 50 to 400. The nano cellulose fiber is a structure of a dispersed single fiber, and the nano cellulose fibers cannot become tangled with each other. As such, the silver nanowires cannot be deposited on the nano cellulose to form an interpenetrating network composite structure with fibers tangled with each other. In short, nano cellulose is not suitable for the composite structure of the disclosure.

In contrast, the nanofibers in embodiments of the disclosure have a long, continuous, interlaced structure, and the nanofibers are tangled with each other. In one embodiment, the silver nanowires have a diameter of about 50 nm to 80 nm, and their diameter is much larger than the diameter of the nanofibers. On the other hand, the nanofibers of the embodiments in the disclosure have a diameter of 50 nm to 500 nm regardless of length, which is beneficial to supporting the silver nanowires to form an interpenetrating network composite structure with fibers tangled with each other. Moreover, it may efficiently disperse the silver nanowires.

In one embodiment, the nanofibers include polyacrylonitrile (PAN), polyvinyl alcohol (PVA), polyvinylpyrrolidone (PVP), polyimide (PI), polyurethane (PU), polyamide (PA), or a combination thereof.

In one embodiments of the disclosure, the polymer of the nanofibers has a viscosity of 1000 to 4000 cps at 25° C., and the viscosity of the polymer in the nanofibers is proportional to its molecular weight. If the viscosity of the polymer in the nanofibers is too low, the electrospun nanofibers cannot have the desired size. If the viscosity of the polymer in the nanofibers is too high, electrospinning cannot be performed.

In a specific embodiment, the composite structure may further include conductive material. The conductive material can be graphene, carbon nanotube, poly(3,4-ethylenedioxythiophene):polystyrene sulfonate (PEDOT:PSS), or a combination thereof.

Specifically, the composite structure may further include a binder. For example, the binder can be polyvinyl alcohol, polyacrylic acid, polyvinyl pyrrolidone, or a combination thereof. The binder in the embodiments may contribute to combine the composite structure with other support and increase the adhesion therebetween.

In one embodiment, the composite structure has a porosity of 60% to 90%, a light transmittance of 70% to 90%, and a sheet resistance of $1\Omega/\square$ to $10^3\Omega/\square$. In some embodiments, the polymer is electrospun into long and continuous nanofibers. The nanofibers may physically tangle and stack to increase the specific surface area and pores, such that the composite structure has high porosity and gas permeability.

In one embodiment, the composite structure may adhere onto a substrate of any shape such as flat, curve, wire material (e.g. electroluminescence fiber but not be limited thereto), or irregular shape. Alternatively, the silver nanowires can be used to form a composite structure of low sheet resistance through dipping, spray, coating, and the like.

In one embodiment, the planar composite structure with low sheet resistance can be cut to strips, and then wrapped on an outer layer of electronic products (e.g. flat devices) or smart textiles for achieving conductive effect and excellent gas permeability (due to high porosity).

Some other embodiments of the disclosure provide a dispersion, including 1 part by weight of the silver nanowires, 1.2 to 3 parts by weight of nanofibers, and 500 to 2000 parts by weight of solvent, in which the diameter of the silver nanowires and the diameter of the nanofibers have a ratio of 1:1 to 1:10. In one embodiment, the silver nanowires have an aspect ratio (length/diameter) of 300 to 1000. If the solvent ratio is too low, the cost will be too high and the dispersion will be non-uniform. If the solvent ratio is too high, the subsequent processing will be difficult.

In one embodiment, the solvent includes water, ethanol, another suitable solvent, or a combination thereof. Note that the solvent should not dissolve the nanofibers. In another embodiment, the substrate (e.g. wire material) can be dipped in the described dispersion, and then taken out of the dispersion and dried to remove the solvent, thereby forming the described composite structure on the substrate. Alternatively, the dispersion can be directly spray coated on the surface of the nanofibers to form the described composite structure.

Accordingly, the specific diameter ratio of the silver nanowires and the nanofibers results in an excellent interaction of the carbon, oxygen, and nitrogen of the nanofibers. As such, the nanofibers and the silver nanowires are tangled and combined to each other to increase the affinity between the composite structures and the uniformity of the dispersion.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

Preparation Example 1 (Silver Nanowires)

100 mL of ethylene glycol was put into a reaction bottle, 0.01 mole of polyvinylpyrrolidone (PVP, Mw=360000) serving as a protection agent was added into the reaction bottle to be fully stirred at a rotation speed of 200 rpm. As such, PVP is uniformly dispersed in the ethylene glycol to obtain a first solution. 0.01 mole of silver nitrate and 0.0003 mole of nickel sulfate were dissolved in 50 mL of ethylene glycol, and fully stirred to obtain second solution. The first solution was heated to 150° C., and the second solution was then added to the first solution to obtain a third solution, in which the nickel sulfate and the silver nitrate had a molar ratio of 1:0.0006, and PVP and silver nitrate had a molar ratio of 1:1. The third solution was reacted for 51 minutes, and then purified by a centrifuge and washed by de-ionized water to obtain silver nanowires. Please refer to Taiwan Patent No. 1476160 for details of preparing the silver nanowires.

Preparation Example 2 (Nanofibers)

Polyacrylonitrile (PAN) was dissolved in dimethylacetamide (DMAc, 99.8%) and stirred at room temperature for 24 hours to 48 hours to obtain a polymer solution (10 wt %). The polymer solution was put in an electric field with a potential of 40 kV to 60 kV to be electrospun with a spinning distance of 14 cm to 18 cm. The polymer was interlaced and interwoven to obtain nanofibers with uniformly distributed diameter of about 100 nm to 200 nm.

Preparation Example 3 (Nanofibers)

Polyimide (PI) was dissolved in DMAc (99.8%) and stirred at room temperature for 24 hours to 48 hours to obtain a polymer solution (25 wt %). The polymer solution was put in an electric field with a potential of 40 kV to 60 kV to be electrospun with a spinning distance of 14 cm to 18 cm. The polymer was interlaced and interwoven to obtain nanofibers with uniformly distributed diameter of about 75 nm to 250 nm.

Preparation Example 4 (Nanofibers)

Polyurethane (PU) was dissolved in DMAc (99.8%) and stirred at room temperature for 24 hours to 48 hours to obtain a polymer solution (12 wt %). The polymer solution was put in an electric field with a potential of 40 kV to 60 kV to be electrospun with a spinning distance of 14 cm to 18 cm. The polymer was interlaced and interwoven to obtain nanofibers with uniformly distributed diameter of about 250 nm to 400 nm.

Example 1

First, a nonwoven fabric was provided to serve as a substrate. A layer (with a basis weight of 2 g/m$^2$) of PAN nanofibers (with a viscosity of 1000 to 4000 cps at 25° C. and a diameter of 100 nm to 200 nm) was laid on the substrate to serve as a support of silver nanowires. Subsequently, silver nanowires with an aspect ratio of 300 to 1000 were dispersed in water to form a dispersion (0.5 mg/mL), and then spray coated on the layer of PAN nanofibers to form a conductive layer of silver nanowires. The spray coating was performed at a spray speed of 250 mm/s, an air flux speed of 0.4 kg/cm$^2$, and a spray coating height (the distance between the nozzle and the layer of PAN nanofibers) of 4.5 cm. After spray coating, the coating was baked at 80° C. in an oven for 10 minutes to obtain a composite structure (1). The porosity of the composite structure (1) was calculated as 79.57% by Formula 1. The sheet resistance of the composite structure (2) was measured as 268Ω/□ by a low impedance meter with four-point probe (MCP-T370), as shown in Table 1. The porosity described here means the ratio (%) between volume of pores in a material and volume of the material in a nature state. The porosity (P) can be calculated by Formula 1:

$$P = \frac{V_0 - V}{V_0} \times 100\% = \left(1 - \frac{\rho_0}{\rho}\right) \times 100\% \qquad \text{(Formula 1)}$$

In Formula 1, P is the porosity of the material, $V_0$ is the volume of the material in a nature state (cm$^3$ or m$^3$), $\rho_0$ is bulk density of the material (g/cm$^3$ or kg/cm$^3$), V is the absolute dense volume of the material (cm$^3$ or m$^3$), and p is the density of the material (g/cm$^3$ or kg/cm$^3$).

Example 2

First, a nonwoven fabric was provided to serve as a substrate. A layer (with a basis weight of 2 g/m$^2$) of PAN nanofibers (with a viscosity of 1000 to 4000 cps at 25° C. and a diameter of 100 nm to 200 nm) was laid on the substrate to serve as a support of silver nanowires. Subsequently, silver nanowires with an aspect ratio of 300 to 1000 were dispersed in water to form a dispersion (0.5 mg/mL), and then spray coated on the layer of PAN nanofibers to form a conductive layer of silver nanowires. The spray coating was performed at a spray speed of 200 mm/s, an air flux speed of 0.6 kg/cm$^2$, and a spray coating height (the distance between the nozzle and the layer of PAN nanofibers) of 4.5 cm. After spray coating, the coating was baked at 80° C. in an oven for 10 minutes to obtain a composite structure (2). The porosity of the composite structure (2) was calculated as 78.43% by Formula 1. The sheet resistance of the composite structure (2) was measured as 161Ω/□ by a low impedance meter with four-point probe (MCP-T370), as shown in Table 1.

Example 3

First, a nonwoven fabric was provided to serve as a substrate. A layer (with a basis weight of 2 g/m$^2$) of PAN nanofibers (with a viscosity of 1000 to 4000 cps at 25° C. and a diameter of 100 nm to 200 nm) was laid on the substrate to serve as a support of silver nanowires. Subsequently, silver nanowires with an aspect ratio of 300 to 1000 were dispersed in water to form a dispersion (0.5 mg/mL), and then spray coated on the layer of PAN nanofibers to form a conductive layer of silver nanowires. The spray coating was performed at a spray speed of 200 mm/s, an air flux speed of 0.4 kg/cm$^2$, and a spray coating height (the distance between the nozzle and the layer of PAN nanofibers) of 4.5 cm. After spray coating, the coating was baked at 80° C. in an oven for 10 minutes to obtain a composite structure (3). The porosity of the composite structure (3) was calculated as 77.95% by Formula 1. The sheet resistance of the composite structure (3) was measured as 89.1Ω/□ by a low impedance meter with four-point probe (MCP-T370), as shown in Table 1.

Example 4

First, a nonwoven fabric was provided to serve as a substrate. A layer (with a basis weight of 2 g/m$^2$) of PAN nanofibers (with a viscosity of 1000 to 4000 cps at 25° C. and a diameter of 100 nm to 200 nm) was laid on the substrate to serve as a support of silver nanowires. Subsequently, silver nanowires with an aspect ratio of 300 to 1000 were dispersed in water to form a dispersion (0.5 mg/mL), and then spray coated on the layer of PAN nanofibers to form a conductive layer of silver nanowires. The spray coating was performed at a spray speed of 100 mm/s, an air flux speed of 0.6 kg/cm$^2$, and a spray coating height (the distance between the nozzle and the layer of PAN nanofibers) of 4.5 cm. After spray coating, the coating was baked at 80° C. in an oven for 10 minutes to obtain a composite structure (4). The porosity of the composite structure (4) was calculated as 74.48% by Formula 1. The sheet resistance of the composite structure (4) was measured as 23.9Ω/□ by a low impedance meter with four-point probe (MCP-T370), as shown in Table 1.

Example 5

First, a nonwoven fabric was provided to serve as a substrate. A layer (with a basis weight of 2 g/m$^2$) of PI nanofibers (with a viscosity of 1000 to 4000 cps at 25° C. and a diameter of 75 nm to 250 nm) was laid on the substrate to serve as a support of silver nanowires. Subsequently, silver nanowires with an aspect ratio of 300 to 1000 were dispersed in water to form a dispersion (0.5 mg/mL), and then spray coated on the layer of PI nanofibers to form a conductive layer of silver nanowires. The spray coating was performed at a spray speed of 200 mm/s, an air flux speed of 0.6 kg/cm$^2$, and a spray coating height (the distance between the nozzle and the layer of PI nanofibers) of 4.5 cm. After spray coating, the coating was baked at 80° C. in an oven for 10 minutes to obtain a composite structure (5). The porosity of the composite structure (5) was calculated as 88.89% by Formula 1. The sheet resistance of the composite structure (5) was measured as 16.6Ω/□ by a low impedance meter with four-point probe (MCP-T370), as shown in Table 1.

Example 6

First, a polyethylene terephthalate (PET) film was provided to serve as a substrate. A layer (with a basis weight of 0.44 g/m$^2$) of PAN nanofibers (with a viscosity of 1000 to 4000 cps at 25° C. and a diameter of 70 nm to 100 nm) was laid on the substrate to serve as a support of silver nanowires. Subsequently, silver nanowires with an aspect ratio of 300 to 1000 were dispersed in water to form a dispersion (0.5 mg/mL), and then spray coated on the layer of PAN nanofibers to form a conductive layer of silver nanowires. The spray coating was performed at a spray speed of 200 mm/s, an air flux speed of 0.6 kg/cm$^2$, and a spray coating height (the distance between the nozzle and the layer of PAN nanofibers) of 4.5 cm. After spray coating, the coating was baked at 80° C. in an oven for 10 minutes to obtain a composite structure (6). The porosity of the composite structure (6) was calculated as 80.21% by Formula 1. The sheet resistance of the composite structure (6) was measured as 507Ω/□ by a low impedance meter with four-point probe (MCP-T370), and the light transmittance of the composite structure (6) was measured as 75.07% by an integrating sphere spectrophotometer, as shown in Table 1. Accordingly, the light transmittance of the PET film with the composite structure formed thereon still had a light transmittance of 75.07%, which means this embodiment could be applied to a product with a demand of a little light transmittance.

Example 7

First, a nonwoven fabric was provided to serve as a substrate. A layer (with a basis weight of 2 g/m$^2$) of PU nanofibers (with a viscosity of 1000 to 4000 cps at 25° C. and a diameter of 250 nm to 400 nm) was laid on the substrate to serve as a support of silver nanowires. Subsequently, silver nanowires with an aspect ratio of 300 to 1000 were dispersed in water to form a dispersion (0.5 mg/mL), and then spray coated on the layer of PU nanofibers to form a conductive layer of silver nanowires. The spray coating was performed at a spray speed of 200 mm/s, an air flux speed of 0.6 kg/cm$^2$, and a spray coating height (the distance between the nozzle and the layer of PU nanofibers) of 4.5 cm. After spray coating, the coating was baked at 80° C. in an oven for 10 minutes to obtain a composite structure (7). The porosity of the composite structure (7) was calculated as 63.28% by Formula 1. The sheet resistance of the composite structure (7) was measured as 211Ω/□ by a low impedance meter with four-point probe (MCP-T370), as shown in Table 1.

then slowly added to ethanol and stirred for 1 hour to prepare a suspension (0.1 wt % silver nanowires). Subsequently, the wire material was dipped in the suspension for 10 seconds, and then put into an oven to be baked at 80° C. for 3 minutes, thereby forming a composite structure (8) with a conductive layer on the surface of the wire material, as shown in FIG. 1. The resistance of the conductive layer of the silver nanowires was measured as 76.5Ω by a multimeter (with a distance of 1 cm from the conductive layer), as shown in Table 2. In FIG. 1, the nanofibers 100 had a larger diameter and were curved, and the silver nanowires 110 had a smaller diameter and were straight. As shown in FIG. 1, the nanofibers 100 and the silver nanowires 110 were interlaced, and the silver nanowires 110 were uniformly dispersed between the nanofibers 100 to form the composite structure.

Comparative Example 1

First, a nonwoven fabric was provided to serve as a substrate. Subsequently, silver nanowires with an aspect ratio of 300 to 1000 were dispersed in water to form a dispersion (0.5 mg/mL), and then spray coated on the substrate to form a conductive layer of silver nanowires. The spray coating was performed at a spray speed of 100 mm/s, an air flux speed of 0.6 kg/cm$^2$, and a spray coating height (the distance between the nozzle and the substrate) of 4.5 cm. After spray coating, the coating was baked at 80° C. in an oven for 10 minutes to obtain a composite structure (9). The sheet resistance of the composite structure (9) could not be measured, as shown in Table 1.

Comparative Example 2

First, a 0.3 mm wire material was provided to serve as a substrate. Silver nanowires (with a diameter of 50 nm to 80

TABLE 1

| | Substrate | Nanofibers | Nanofiber diameter (nm) | Aspect ratio of silver nanowires | Sheet resistance |
|---|---|---|---|---|---|
| Example 1 | Nonwoven fabric | PAN (2 g/m$^2$) | 100-200 | 300-1000 | 268 Ω/□ |
| Example 2 | Nonwoven fabric | PAN (2 g/m$^2$) | 100-200 | 300-1000 | 161 Ω/□ |
| Example 3 | Nonwoven fabric | PAN (2 g/m$^2$) | 100-200 | 300-1000 | 89.1 Ω/□ |
| Example 4 | Nonwoven fabric | PAN (2 g/m$^2$) | 100-200 | 300-1000 | 23.9 Ω/□ |
| Example 5 | Nonwoven fabric | PI (2 g/m$^2$) | 75-250 | 300-1000 | 16.6 Ω/□ |
| Example 6 | PET transparent film (Light transmittance of 90.65%) | PAN (0.44 g/m$^2$) (Light transmittance of 81.54%) | 70-100 | 300-1000 | 507 Ω/□ (Light transmittance of 75.07%) |
| Example 7 | Nonwoven fabric | PU (5.6 g/m$^2$) | 250-400 | 300-1000 | 211 Ω/□ |
| Comparative Example 1 | Nonwoven fabric | None | None | 300-1000 | OL |
| Comparative Example 4 | Nonwoven fabric | PAN (2 g/m$^2$) | 100-200 | 50-250 | OL |

Note:
OL means over the measurement limit of four-point probe

As shown in Table 1, if nanofiber layer was not used or the aspect ratio of the silver nanowires was too low (e.g. 50 to 250), the sheet resistance of the composite structures could not be measured.

Example 8

First, a 0.3 mm wire material was provided to serve as a substrate. Nanofibers (with a diameter of 100 nm to 200 nm) were put in an ethanol solvent to be uniformly dispersed, and silver nanowires (with a diameter of 50 nm to 80 nm) were nm) were added to ethanol and stirred for 1 hour to prepare a suspension (0.1 wt % silver nanowires). Subsequently, the wire material was dipped in the suspension for 10 seconds, and then put into an oven to be baked at 80° C. for 3 minutes, thereby forming a composite structure (10) with a conductive layer on the surface of the wire material. The resistance of the conductive layer of the silver nanowires could not be measured by a multimeter (with a distance of 1 cm from the conductive layer), as shown in Table 2.

Comparative Example 3

First, a 0.3 mm wire material was provided to serve as a substrate. Silver nanowires (with a diameter of 50 nm to 80 nm) were added to ethanol and stirred for 1 hour to prepare a suspension (2.5 wt % silver nanowires). Subsequently, the wire material was dipped in the suspension for 10 seconds, and then put into an oven to be baked at 80° C. for 3 minutes, thereby forming a composite structure (11) with a conductive layer on the surface of the wire material. The resistance of the conductive layer of the silver nanowires was measured as 80Ω by a multimeter (with a distance of 1 cm from the conductive layer), as shown in Table 2.

Comparative Example 4

First, a nonwoven fabric was provided to serve as a substrate. A layer (with a basis weight of 2 g/m$^2$) of PAN nanofibers (with a viscosity of 1000 to 4000 cps at 25° C. and a diameter of 100 nm to 200 nm) was laid on the substrate to serve as a support of silver nanowires. Subsequently, silver nanowires with an aspect ratio of 50 to 250 were dispersed in water to form a dispersion (0.5 mg/mL), and then spray coated on the layer of PU nanofibers to form a conductive layer of silver nanowires. The spray coating was performed at a spray speed of 200 mm/s, an air flux speed of 0.6 kg/cm$^2$, and a spray coating height (the distance between the nozzle and the layer of PU nanofibers) of 4.5 cm. After spray coating, the coating was baked at 80° C. in an oven for 10 minutes to obtain a composite structure (12). The porosity of the composite structure (12) was calculated as 78.23% by Formula 1. The sheet resistance of the composite structure (12) could not be measured, as shown in Table 1.

TABLE 2

| | Substrate | Silver nanowires (concentration/ wire diameter) | Nanofiber diameter | Resistance |
|---|---|---|---|---|
| Example 8 | 0.3 mm wire material | 0.1 wt %, wire diameter: 50-80 nm | 100-200 nm | 76.5 Ω |
| Comparative Example 2 | 0.3 mm wire material | 0.1 wt %, wire diameter: 50-80 nm | None | OL |
| Comparative Example 3 | 0.3 mm wire material | 2.5 wt %, wire diameter: 50-80 nm | None | 80 Ω |

Note:
OL means over the measurement limit of four-point probe

As shown in Table 2, the composite structure free of nanofibers was not conductive (see Comparative Example 2), even if the process conditions were same. If the composite structure was free of the nanofibers, the amount of the silver nanowires should be greatly increased (See Comparative Example 3) to achieve the resistance similar to that of Example 8, which would increase the cost.

In some embodiments of the disclosure, the diameter range of the nanofibers is adjusted to collocate with the specific aspect ratio of the silver nanowires, which not only addresses the non-uniform dispersion issue in conventional skills, but also achieves low resistance and reduces the amount of the silver nanowires to lower the cost. On the other hand, the composite structure can be used in outer layer of smart textiles to achieve excellent conductive effect and enhance the gas permeability (due to its high porosity).

It will be apparent to those skilled in the art that various modifications and variations can be made to the disclosed methods and materials. It is intended that the specification and examples be considered as exemplary only, with the true scope of the disclosure being indicated by the following claims and their equivalents.

What is claimed is:
1. A composite structure, comprising:
   1 part by weight of silver nanowires, wherein the silver nanowires have a length of 20 μm to 50 μm; and
   1.2 to 3 parts by weight of nanofibers,
   wherein a diameter of the silver nanowires and a diameter of the nanofibers have a ratio of 1:1 to 1:10,
   wherein the nanofibers comprise polyacrylonitrile, polyvinyl alcohol, polyvinylpyrrolidone, polyimide, polyurethane, polyamide, or a combination thereof.
2. The composite structure as claimed in claim 1, wherein the silver nanowires have a diameter of 50 nm to 80 nm.
3. The composite structure as claimed in claim 1, wherein the silver nanowires have an aspect ratio (length/diameter) of 300 to 1000.
4. The composite structure as claimed in claim 1, wherein the nanofibers have a diameter of 50 nm to 500 nm.
5. The composite structure as claimed in claim 1, further comprising conductive material.
6. The composite structure as claimed in claim 5, wherein the conductive material comprises graphene, carbon nanotube, poly(3,4-ethylenedioxythiophene): polystyrene sulfonate, or a combination thereof.
7. The composite structure as claimed in claim 1, further comprising a binder.
8. The composite structure as claimed in claim 1, having a porosity of 60% to 90%.
9. The composite structure as claimed in claim 1, having a light transmittance of 70% to 90%.
10. The composite structure as claimed in claim 1, having a sheet resistance of 1Ω/□ to 10$^3$Ω/□.
11. A dispersion, comprising:
    1 part by weight of silver nanowires, wherein the silver nanowires have a length of 20 μm to 50 μm;
    1.2 to 3 parts by weight of nanofibers; and
    500 to 2000 parts by weight of solvent,
    wherein the diameter of the silver nanowires and the diameter of the nanofibers have a ratio of 1:1 to 1:10,
    wherein the nanofibers comprise polyacrylonitrile, polyvinyl alcohol, polyvinylpyrrolidone, polyimide, polyurethane, polyamide, or a combination thereof.
12. The dispersion as claimed in claim 11, wherein the silver nanowires have a diameter of 50 nm to 80 nm.
13. The dispersion as claimed in claim 11, wherein the silver nanowires have an aspect ratio (length/diameter) of 300 to 1000.
14. The dispersion as claimed in claim 11, wherein the nanofibers have a diameter of 50 nm to 500 nm.
15. The dispersion as claimed in claim 11, wherein the solvent comprises water, ethanol, or a combination thereof.

* * * * *